United States Patent [19]

Kawate et al.

[11] Patent Number: 5,206,579
[45] Date of Patent: Apr. 27, 1993

[54] BATTERY CHARGER AND CHARGE CONTROLLER THEREFOR

[75] Inventors: Yosuke Kawate, Omihachiman; Norihiko Nakano, Kitaibaragi; Tadashi Kato, Chiba, all of Japan

[73] Assignee: Nippon Densan Corporation, Kyoto, Japan

[21] Appl. No.: 660,408

[22] Filed: Feb. 22, 1991

[30] Foreign Application Priority Data

Feb. 26, 1990 [JP] Japan .................................. 2-46403
Feb. 28, 1990 [JP] Japan .................................. 2-48302
Mar. 1, 1990 [JP] Japan .................................. 2-50420

[51] Int. Cl.$^5$ ............................................. H02J 7/04
[52] U.S. Cl. .......................................... 320/20; 320/31; 320/38; 320/40
[58] Field of Search ................... 320/20, 31, 37, 38, 320/39, 40

[56] References Cited

U.S. PATENT DOCUMENTS

| | | | |
|---|---|---|---|
| 4,035,709 | 7/1977 | Seider et al. ................. | 320/31 X |
| 4,087,733 | 5/1978 | Casagrande ................... | 320/37 X |
| 4,503,378 | 3/1985 | Jones et al. .................. | 320/20 |
| 4,609,861 | 9/1986 | Inaniwa et al. ............... | 320/39 X |
| 4,639,655 | 1/1987 | Westhaver et al. ............. | 320/20 |
| 4,647,834 | 3/1987 | Castleman .................... | 320/31 X |
| 4,668,901 | 5/1987 | Furukawa ..................... | 320/31 |
| 4,746,854 | 5/1988 | Baker et al. ................. | 320/20 X |
| 4,886,840 | 2/1989 | Alexander et al. ............. | 320/20 |

Primary Examiner—R. J. Hickey
Attorney, Agent, or Firm—McCormick, Paulding & Huber

[57] ABSTRACT

A battery charger and a charge controller therefor are disclosed, the battery charger including a supply circuit for supplying a charging current to a battery and a control circuit for controlling the supply of the charging current to the battery. The control circuit shuts the charging current when the detected voltage of the battery is smaller than the maximum peak value by a predetermined quantity. A control means shuts the charging current after a predetermined time has elapsed from a time at which the detected voltage of the battery has raised to the maximum peak value. The control means reduces the charging current when the detected voltage of the battery is made to be a switching voltage. Furthermore, the control means shuts the charging current after a predetermined time has elapsed after the charging current had been reduced.

9 Claims, 13 Drawing Sheets

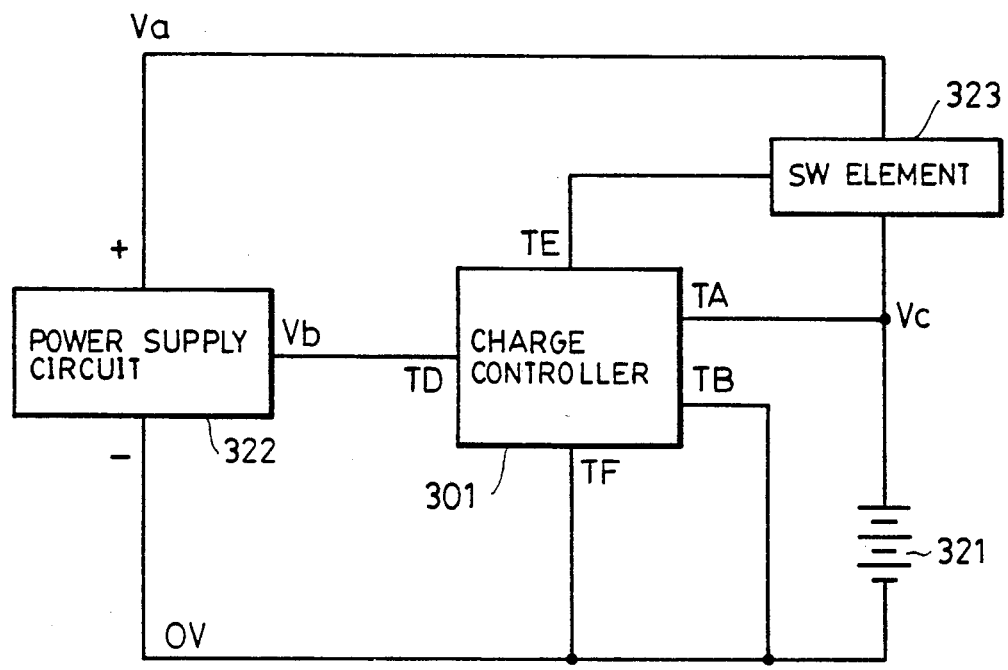
FIG. 13-A
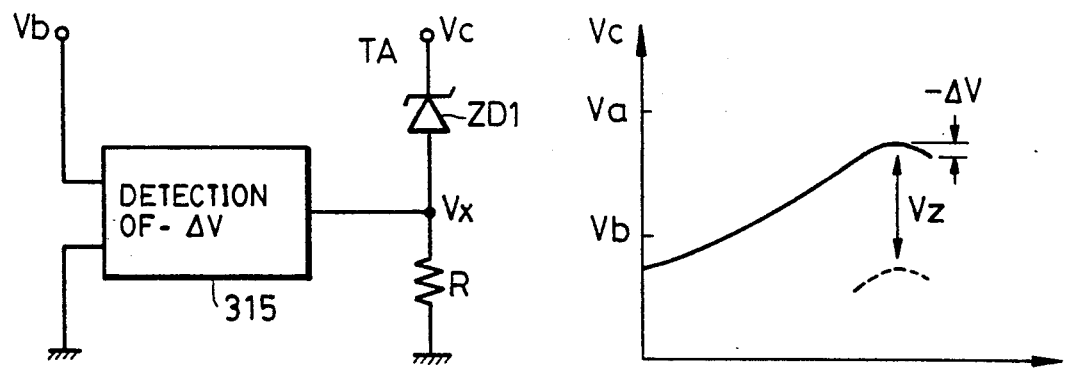
FIG. 13-B
FIG. 13-C

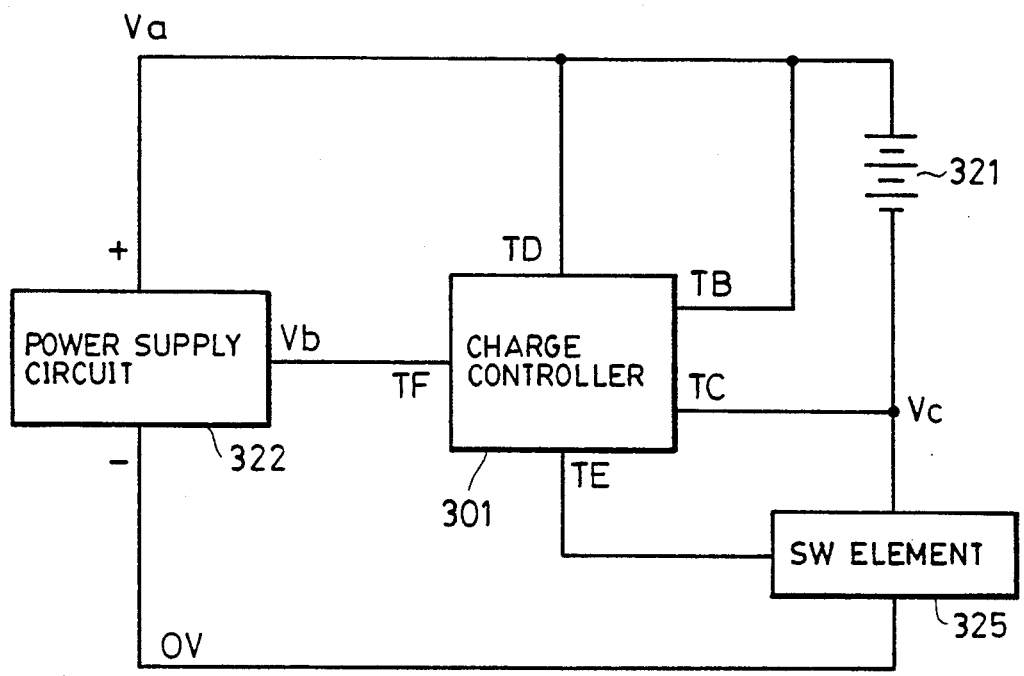
FIG. 14-A
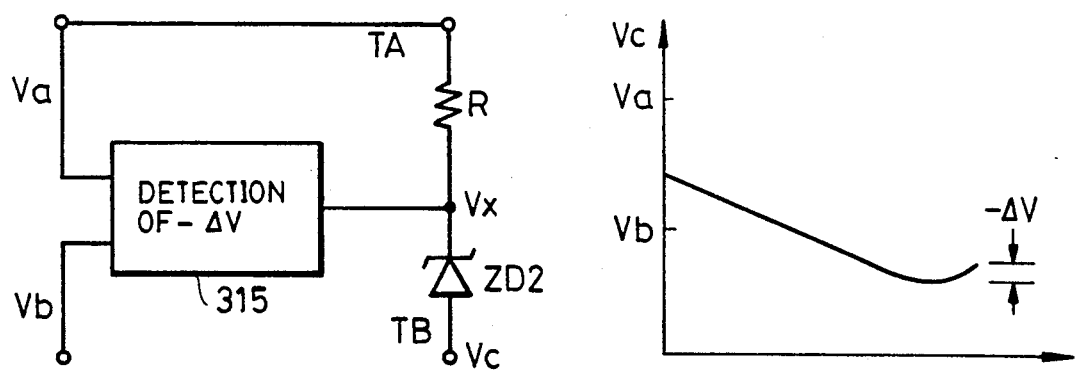
FIG. 14-B
FIG. 14-C

BATTERY CHARGER AND CHARGE CONTROLLER THEREFOR

BACKGROUND OF THE INVENTION

1. Field of the Invention

The present invention relates to a battery charger for charging a battery and a charge controller therefor.

2. Description of the Prior Art

Hitherto, conventional battery chargers have employed a variety of methods for the purpose of preventing overcharge, for example:

(1) A method of controlling a time period in which the charging current is supplied to a predetermined time period by using a timer.

(2) A method arranged in such a manner that the supply of the charging current is stopped when the voltage of the battery has been raised to a predetermined level.

However, the above-described methods are arranged in such a manner that the charging time or the fully-charged voltage (a voltage at which a further charge is stopped) are previously set. In consequence, a problem arises in that the overcharge stopping operation is allowed to be performed uniformly. However, since batteries respectively have different characteristics, a problem arises in that the battery cannot be charged as desired in a case where the full-charge voltage is not adapted to the individual characteristics. Accordingly, the various types of batteries must respectively be subjected to different operations for setting the charging time and the full-charge voltage. In consequence, an extremely complicated work must be performed.

Recently, a rapid charging system utilizing a large current has been put into practical use in order to shorten the time necessary to complete the charging. However, there is a risk that a gas is generated in the battery since the battery electrolyte will be decomposed when the battery is charged with a large current up to its full-charge level. The gas thus generated will undesirably adhere to the surface of the electrode, causing a problem to be arisen in that charging cannot be completed since the gas acts as an insulating layer at the time of the charging operation.

SUMMARY OF THE INVENTION

An object of the present invention to provide a battery charger with which an overcharge can be prevented even if the type of the battery to be charged is different or the battery has non-uniform characteristics while eliminating a necessity of individually setting the charging conditions.

A second object of the present invention is to provide a battery charger capable of fully and desirably charging a battery while preventing a generation of a gas at the time of rapidly charging the battery.

A third object of the present invention is to provide a charge controller which can preferably be applied to a battery charger.

Other and further objects, features and advantages of the invention will be appear more fully from the following description.

BRIEF DESCRIPTION OF THE DRAWINGS

FIGS. 13-A to 13-C illustrate a positive $-\Delta V$ detection mode and are respectively a circuit diagram which illustrates a state of wiring, a circuit diagram which illustrates an essential portion of the same and a graph which illustrates a change in voltage;

FIGS. 14-A to 14-C illustrate a negative $-\Delta V$ detection mode and are respectively a circuit diagram which illustrates a state of wiring, a circuit diagram which illustrates an essential portion of the same and a graph which illustrates a change in voltage.

DESCRIPTION OF THE PREFERRED EMBODIMENTS

Preferred embodiments will now be described in detail with reference to the drawings.

Figure 1:
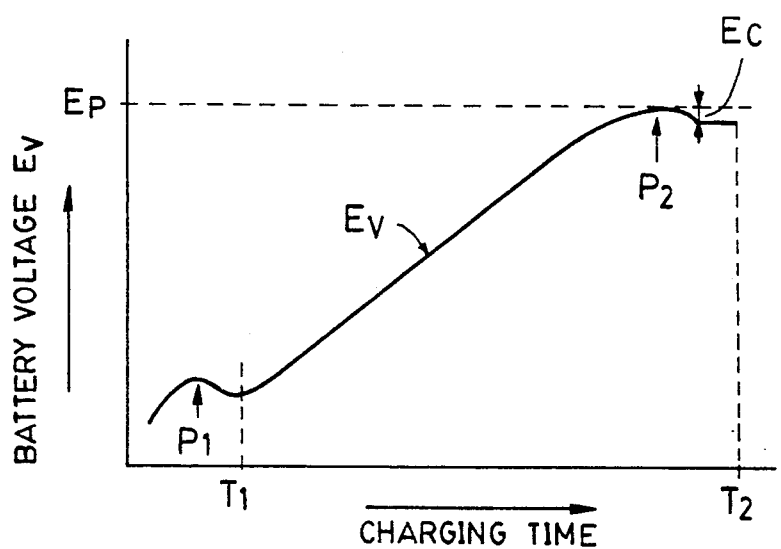
FIG. 1 illustrates a charging characteristic of a nickel-cadmium battery.

FIG. 1 is a graph which illustrates a charging characteristic of a nickel-cadmium battery. The nickel-cadmium battery usually has the relationship between a charging time and battery voltage as shown in FIG. 1. That is, when a battery is installed in a charger and charging is thus commenced, the level of the battery voltage is raised in substantially proportion to the charging time from the start of charging. The level of the battery voltage is subsequently lowered (an initial voltage drop takes place). However, since the battery is charged successively, the level of the battery voltage is again raised in substantially proportion to the charging time. When the level of the voltage approximates the full level, the rate of increase is lowered. Furthermore, the battery voltage reaches its peak level when charging has been completed. The battery is then brought to the overcharged state in which the battery voltage is commenced to be lowered from the peak level.

Then, a battery charger for charging a nickel-cadmium battery of the type having the above-described charging characteristics will be described below.

FIRST EMBODIMENT OF BATTERY CHARGER

Figure 2:
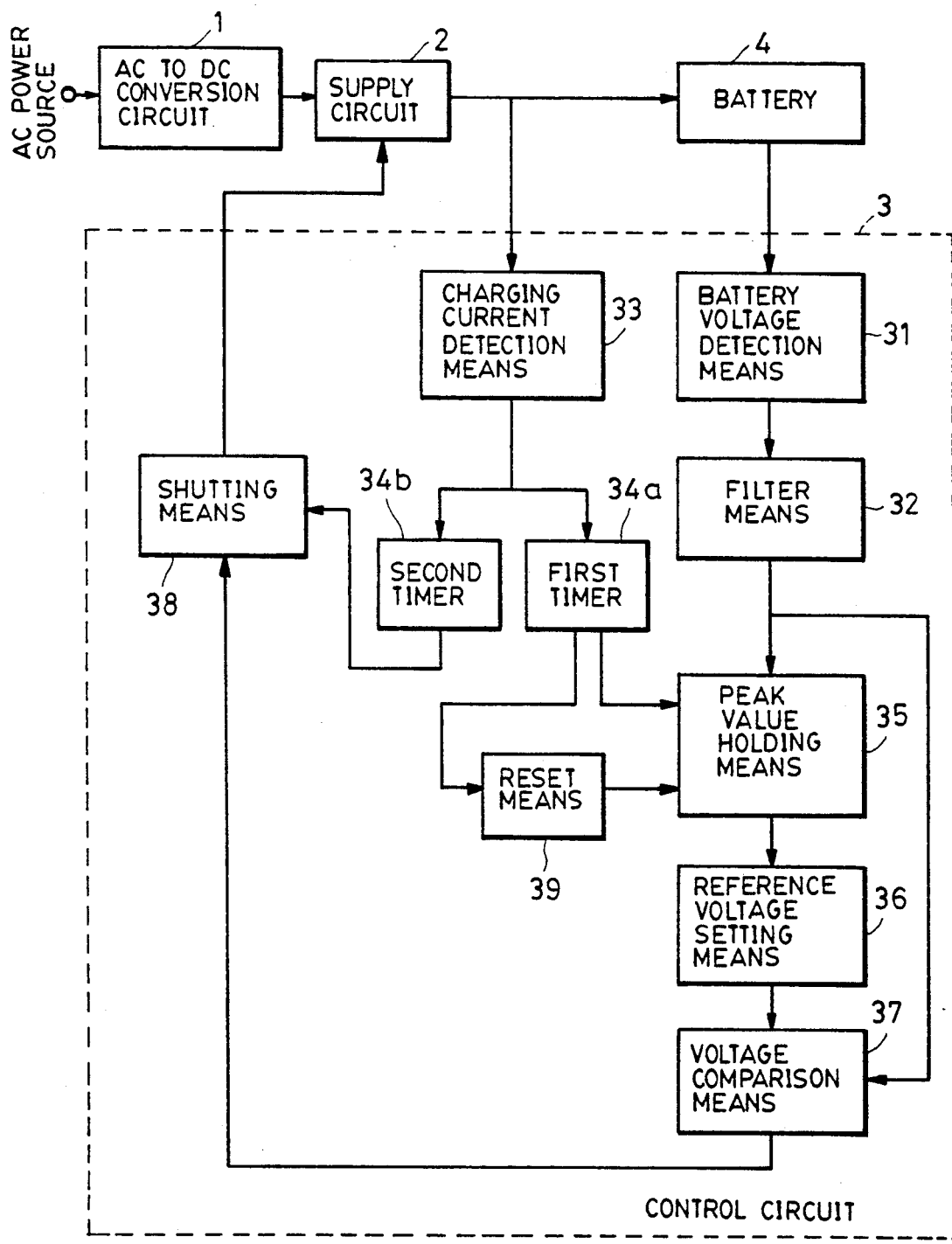
FIG. 2 is a block diagram which illustrates a first embodiment of a battery charger according to the present invention.
Figure 3:
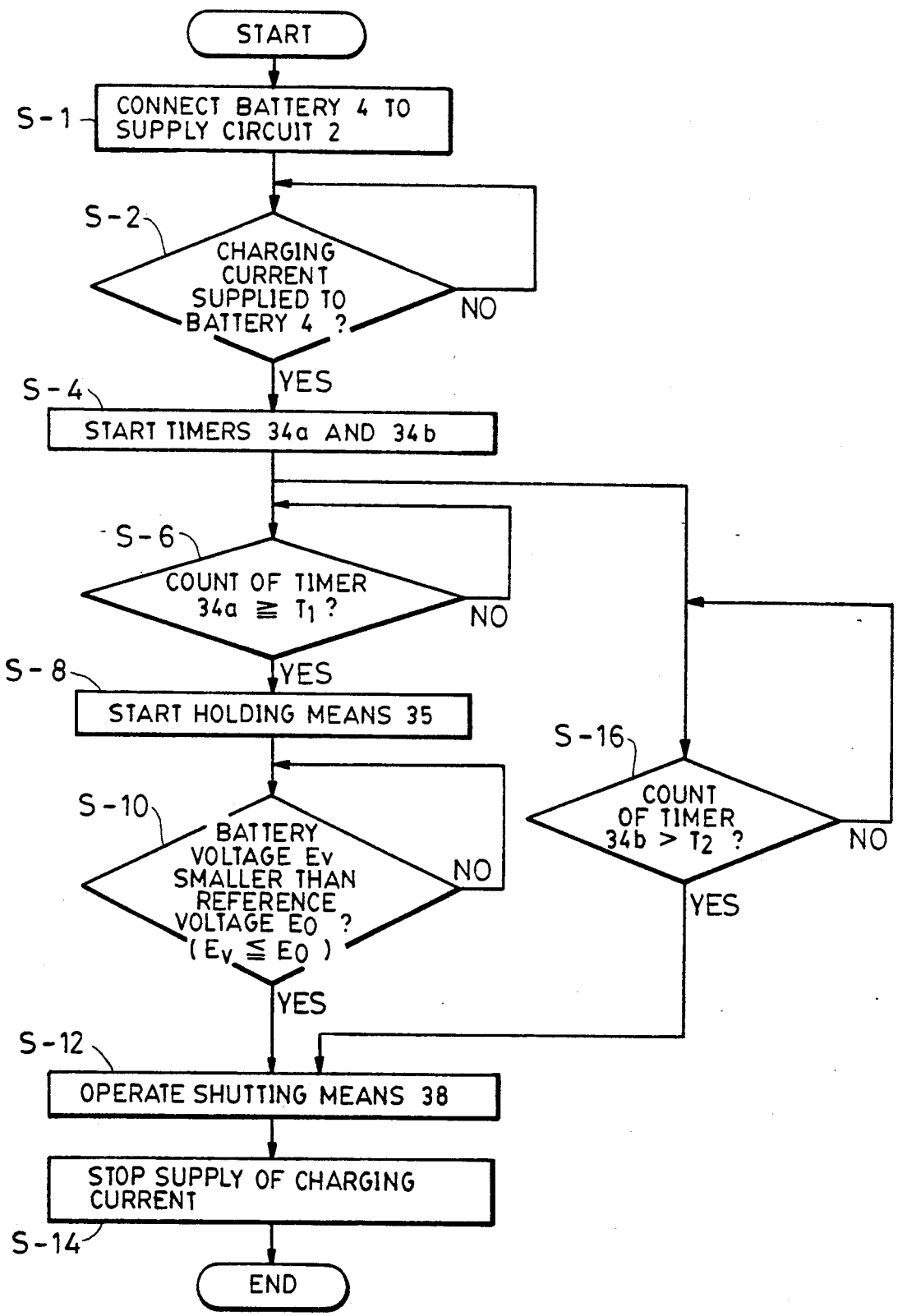
FIG. 3 is a flow chart which illustrates the operation of the battery charger shown in FIG. 2.

FIGS. 2 and 3 are respectively a block diagram and a flow chart of the battery charger according to a first embodiment.

The charger according to the first embodiment is arranged to charge a nickel-cadmium battery in about one hour.

Referring to FIG. 1, the above-described charger is arranged to charge a nickel-cadmium battery in about one hour, the charger comprising, as shown in FIG. 2, an AC to DC conversion circuit 1 for rectifying and smoothing AC power, a supply circuit 2 for stabilizing the output current from the AC to DC conversion circuit 1 so as to supply a predetermined charging current to a battery 4 and a control circuit 3 for controlling the charging current to be supplied to the battery 4.

The control circuit 3 comprises a battery voltage detection means 31 for detecting the voltage of the battery 4, a filter means 32 for removing noise of the battery voltage detected by the battery voltage detection means 31 and a charging current detection means 33 for detecting the charging current to be supplied from the supply circuit 2 to the battery 4. The control circuit 3 further comprises first and second timers 34a and 34b arranged to be commenced when the charging current detection means 33 detects the charging current and a maximum peak value holding means 35 for holding the peak level of the battery voltage supplied via the filter means 32. The control circuit 3 further comprises a reference voltage setting means 36 for setting a reference voltage which is smaller than the peak value voltage held by the maximum peak value holding means 35. The control circuit 3 further comprises a voltage comparison means 37 for subjecting the reference voltage set by the reference voltage setting means 36 and the detected battery voltage supplied via the filter means 32 to a comparison. The control circuit 3 further comprises a shutting means 38 for generating a shutting signal in response to a signal supplied from a voltage comparison means 37 or a signal supplied from the second timer 34b so that the supply circuit 2 is brought into a state in which the supply circuit 2 does not supply the charging current. The control circuit 3 further comprises a reset means 39 for resetting the maximum peak value voltage held by the maximum peak value holding means 35.

The thus constituted battery charger according to this embodiment is operated in accordance with the flow chart shown in FIG. 3.

When the battery 4 is, in step S-1, connected to the charger, the AC converted into a DC of a predetermined voltage by the AC to DC conversion circuit 1 and stabilized by the supply circuit 2 is supplied to the battery 4. Shutting and conducting of the charging current are, similarly to a conventional charger, controlled by turning on/off a transistor (omitted from illustration) of the supply circuit 2. Voltage $E_V$ of the battery 4 is always detected by the battery voltage detection means 31, while the charging current to be supplied to the battery 4 is detected by the charging current detection means 33 (step S-2). When the charging current detection means 33 detects the charging current, that is, when charging to the battery 4 is commenced, the first and second timers 34a and 34b start their time counting operations. The above-described timers 34a and 34b respectively have time T1 for the first timer 34a and set time T2 for the second timer 34b. The above-described times T1 and T2 are properly determined in accordance with the standard specification of the subject battery to be charged. According to this embodiment, time T1 for the first timer 34a is arranged to be about 5 minutes, while the time T2 for the second timer 34b is arranged to be about 1 hour and 15 minutes which is a value obtained by increasing one hour for charging by 25%. The above-described time T1 is arranged to be longer than a time at which the initial peak P1 takes place when the nickel-cadmium battery is charged as shown in FIG. 1 (that is, time T1 is arranged to be longer than a time at which the initial voltage drop takes place). Time T2 is arranged to be longer than a time at which full charge peak P2 takes place when the battery has been completely charged (that is, time T2 is arranged to be longer than a time which is necessary to completely charge the battery). In step S6, it is determined whether or not the first timer 34a has counted the set time T1. If it has been determined that the first timer 34a has counted the set time T1, the flow advances to step S-8 in which the first timer 34a actuates the maximum peak value holding means 35. The first timer 34a generates a reset signal before it counts the above-described time T1. The reset means 39 resets the maximum peak value holding means 35 in response to the above-described reset signal. Voltage $E_V$ of the battery 4 is supplied to the maximum peak value holding means 35 via the battery voltage detection means 31 and the filter means 32a for removing noise. In consequence, the peak value of that voltage is always selected and held by the maximum peak value holding means 35.

In next step S-10, the detected battery voltage $E_V$ and reference voltage $E_0$ are subjected to a comparison, the reference voltage $E_0$ being determined as follows since the nickel-cadmium battery posseses the charging characteristics as shown in FIG. 1: the battery voltage is the highest level (the maximum peak value) when charging has been completed, while the same is lowered in accordance with the degree of the overcharge. Therefore, maximum peak voltage $E_P$ at the time when the battery voltage is raised to the highest level is utilized in such a manner that the supply of the charging current is stopped when the battery voltage has been lowered to the reference voltage $E_0$ which is lower than the maximum peak voltage $E_P$ by a predetermined voltage $E_C$. If the detected battery voltage $E_V$ is lower than the reference voltage $E_0$, it is determined that charging has not been completed, causing the operation in step S-10 to be repeated.

The above-described reference voltage $E_0$ and voltage $E_C$ for determining the reference voltage $E_0$ are determined in accordance with the degree of the charging current and the rated voltage of the battery and the like. According to this embodiment, the rated voltage is, for example, 7.2 V and the predetermined voltage $E_C$ is about 100 mV. The maximum peak voltage $E_P$ and the battery voltage $E_V$ are subjected to a comparison. If the difference between the above-described two voltage levels $E_P$ and $E_V$ is larger than the above-described predetermined voltage $E_C$, the voltage comparison means 37 transmits a signal, and the flow advances to step S-12. In step S-12, the shutting means 38 generates the shutting signal in response to the output signal from the voltage comparison means 37, the shutting signal being then supplied to the supply circuit 2. In consequence, the transistor (omitted from illustration) of the supply circuit 2 is turned off so that the supply of the charging current is stopped (step S-14).

According to the present invention, the "charging current" is defined to be an electric current to be substantially charged into a battery. Furthermore, the "stop of the charging current" is defined to shutting an electric current to be charged into the battery. Therefore, a trickle current for maintaining the charged voltage level is not included in the above-described "charging current".

Similarly to a case of a rapid charging operation, a predetermined current of a small level may be supplied to the battery 4 as the trickle current after the supply of the charging current has been stopped.

In step S-4, when the second timer 34b commences the counting operation, the flow advances to step S-16 in which it is determined whether or not the result of the counting operation has reached the predetermined time T2. If it has been determined that the result of the counting operation performed by the second timer 34b has reached the predetermined time T2, the flow advances to step S-12 regardless of the result of the determination made in step S-10. In step S-12, the supply of the charging current is stopped similarly. That is, there is provided a function capable of reliably protecting the battery, the charger and the like from the overcharge by forcibly shutting the charging current, the shutting of the charging current being performed depending upon a determination made that the protecting function by means of detecting the maximum peak value of the charging voltage has not been operated normally if the charging current is not stopped at the set time T2.

In step S-6, it is determined whether or not the result of the counting operation performed by the first timer 34a has exceeded time T1. If the same exceeds T1, the flow advances to step S-8 in which the maximum peak value holding means 35 is started. The above-described operation is performed for the purpose of preventing an erroneous operation which will take place due to the initial peak phenomenon of the charging characteristics of the nickel-cadmium battery generated at the early stage of the charging operation as shown in FIG. 1. As described above, times T1 and T2 for the corresponding timers 34a and 34b must be determined to be values with which the erroneous operation due to the charging characteristics can be prevented and an operation to serve as a backup can be enabled to be performed.

This embodiment is arranged in such a manner that the maximum peak value holding means 35 is actuated when the result of the counting operation performed by the first timer 34a exceeds time T1. However, another structure may be arranged in which the shutting means 38 does not generate the shutting signal within the above-described time T1 but the same is allowed to generate the shutting signal when the result of the time counting operation exceeds time T1.

The battery charger according to the first embodiment is capable of automatically detecting the completion of charging in accordance with the charging characteristics of the subject battery so as to shut the supply of the charging current. Therefore, the overcharge can be properly prevented regardless of the charging characteristics of the battery. In consequence, a significantly convenient battery charger can be obtained.

SECOND EMBODIMENT OF BATTERY CHARGER

Figure 4:
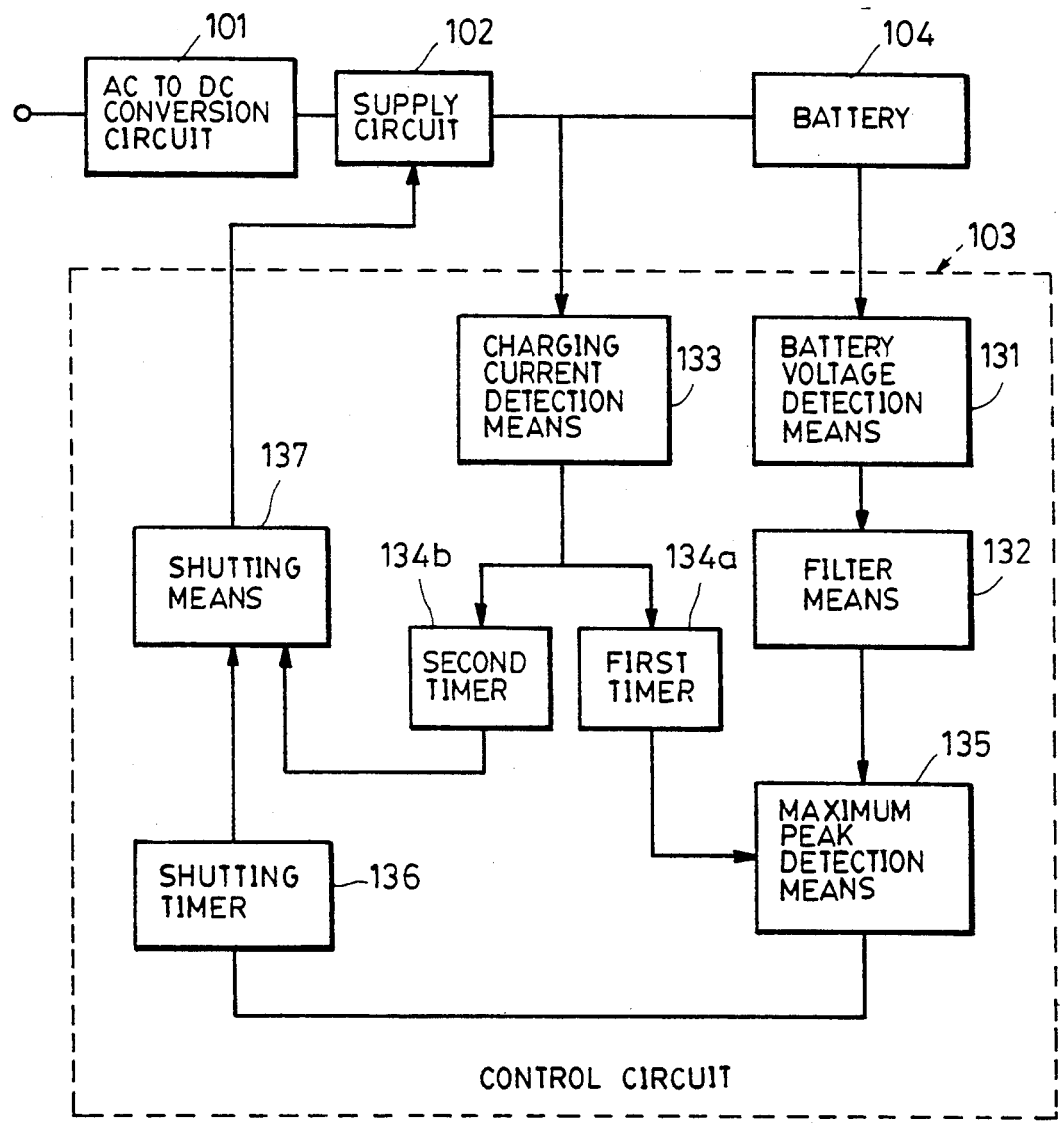
FIG. 4 is a block diagram which illustrates a second embodiment of the battery charger according to the present invention.

The battery charger according to a second embodiment is arranged to charge a nickel-cadmium battery in about one hour. Referring to FIG. 4, the above-described charger is arranged to charge a nickel-cadmium battery in about one hour, the charger comprising, as shown in FIG. 4, an AC to DC conversion circuit 101 for rectifying and smoothing AC power, a supply circuit 102 for stabilizing the output current from the AC to DC conversion circuit 101 so as to supply a predetermined charging current to a battery 104 and a control circuit 103 for controlling a current to be supplied to the battery 104.

The control circuit 103 comprises a battery voltage detection means 131 for detecting the voltage of the battery 104, a filter means 132 for removing noise of the battery voltage detection signal detected by the battery voltage detection means 131 and a charging current detection means 133 for detecting the charging current to be supplied from the supply circuit 102 to the battery 104. The control circuit 103 further comprises first and second timers 134a and 134b arranged to be commenced when the charging current detection means 133 detects the charging current and a maximum peak value holding means 135 for holding the maximum peak level of the battery voltage supplied via the filter means 132. The control circuit 103 further comprises a shutting timer 136 which commences time counting when the maximum peak detection means 135 detects the maximum peak and transmits a control signal after a predetermined time has elapsed. The control circuit 103 further comprises a shutting means 137 for generating a shutting signal in response to a control signal supplied from the shutting timer 136 or a signal supplied from the second timer 134b and brings the supply circuit 102 into a stop state in response to the shutting signal so as to shut the supply of the charging current to be supplied to the battery 104.

Figure 5:
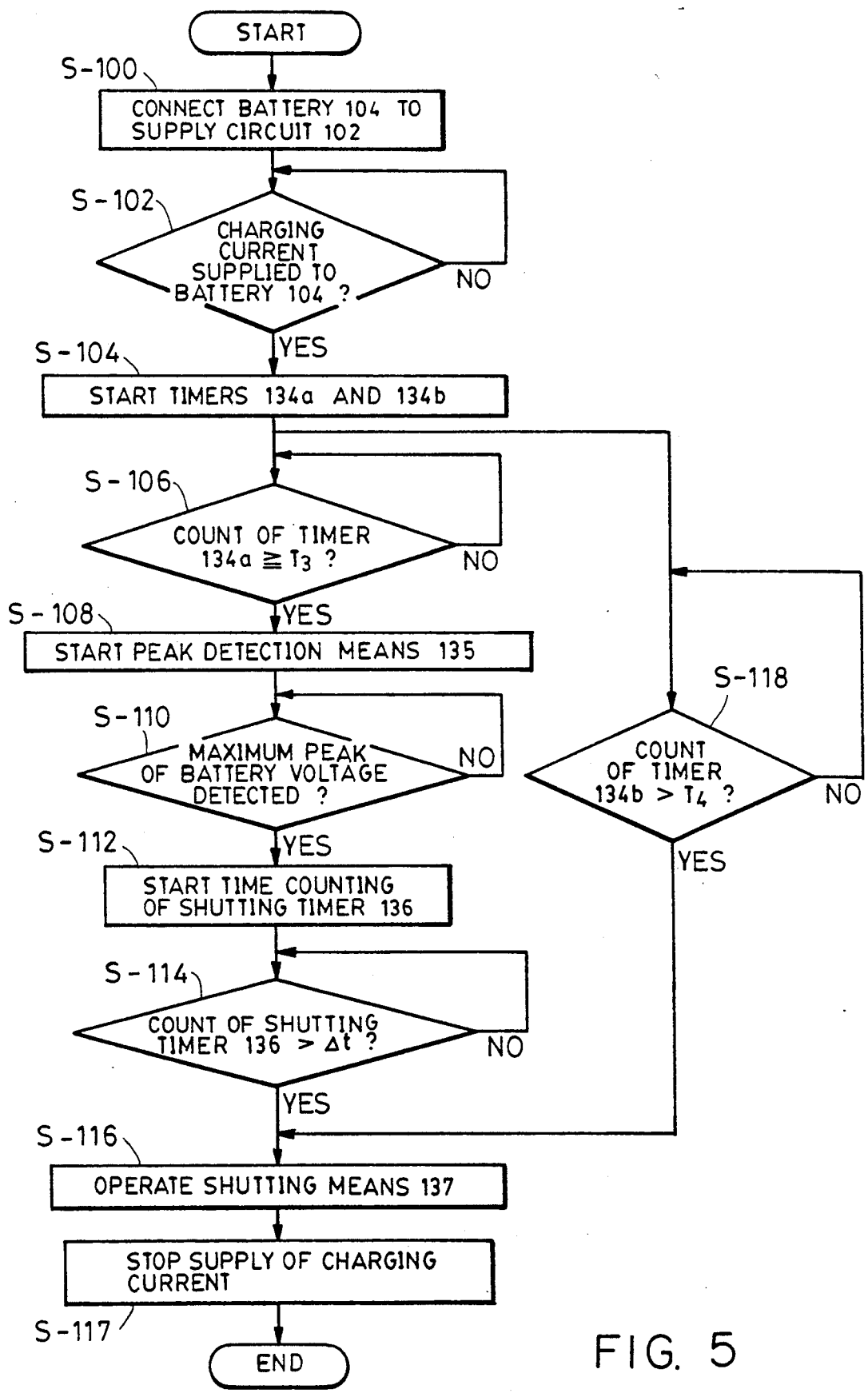
FIG. 5 is a flow chart which illustrates the operation of the battery charger shown in FIG. 4.

The thus constituted battery charger according to the second embodiment is operated in accordance with the flow chart shown in FIG. 5.

When the battery 104 is, in step S-100, connected to the charger, the AC converted into a DC of a predetermined voltage by the AC to DC conversion circuit 101 and stabilized by the supply circuit 102 is supplied to the battery 104. Shutting and conducting of the charging current are, similarly to a conventional charger, controlled by turning on/off a transistor (omitted from illustration) of the supply circuit 102. Voltage $E_V$ of the battery 104 is always detected by the battery voltage detection means 131, while the charging current to be supplied to the battery 104 is detected by the charging current detection means 133 (step S-102).

Figure 6:
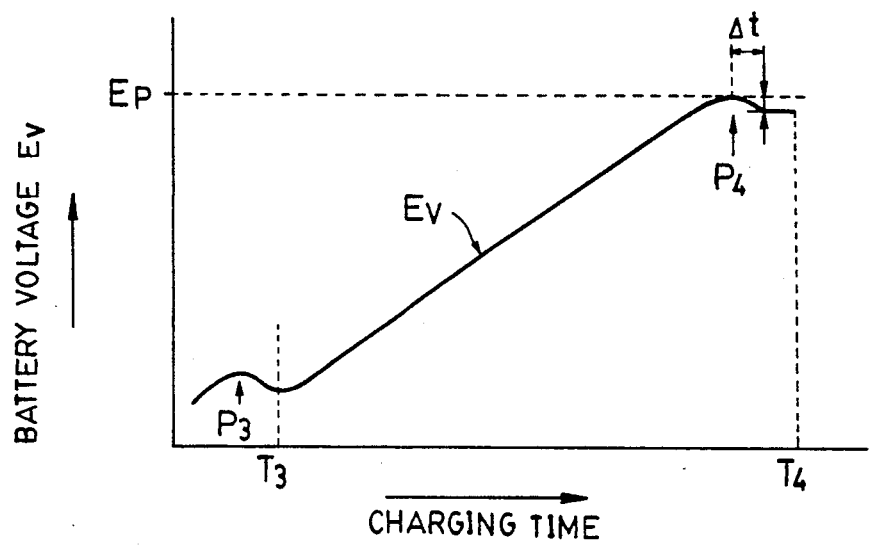
FIG. 6 illustrates a charging characteristic when a nickel-cadmium battery is charged by using the battery charger shown in FIG. 4.
Figure 7:
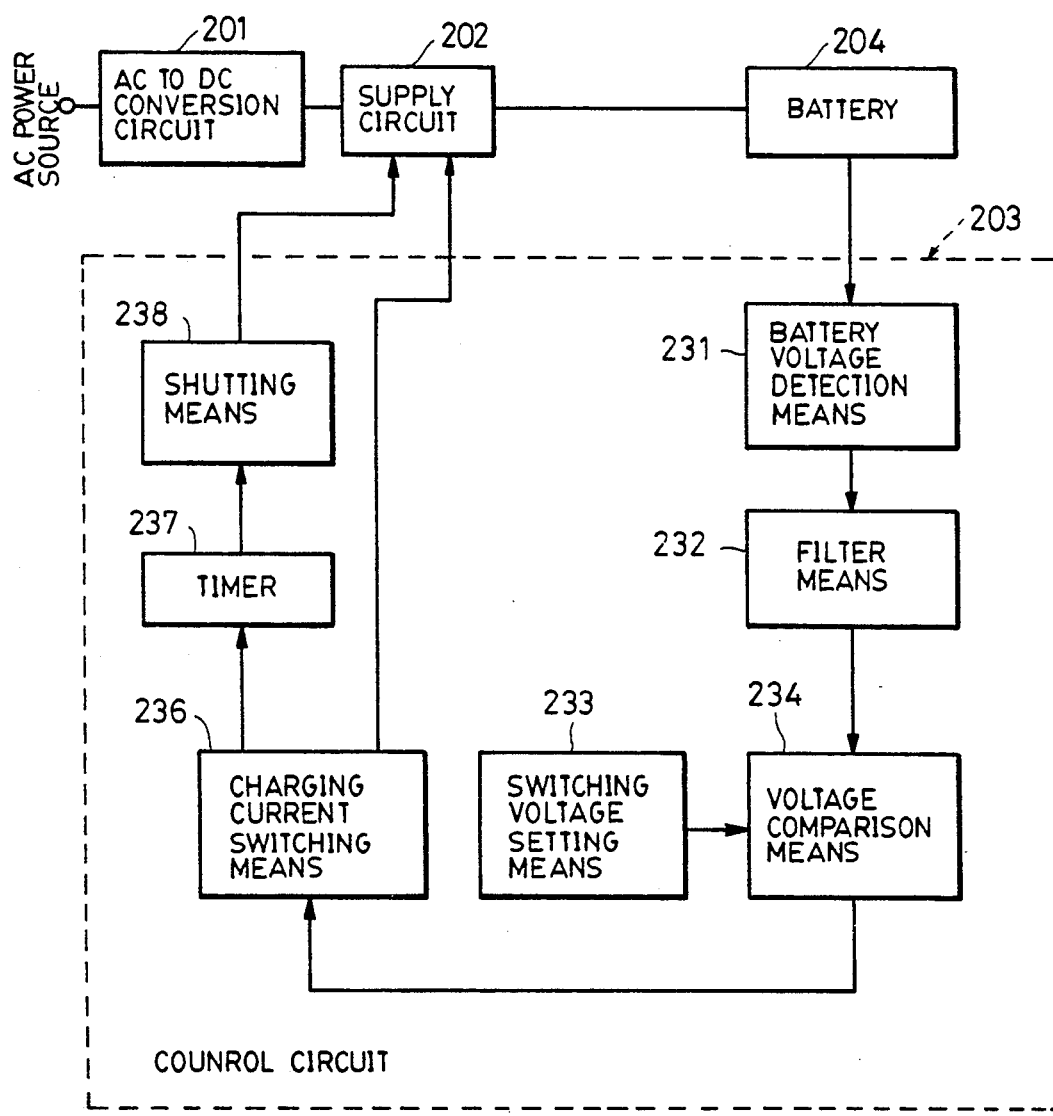
FIG. 7 is a block diagram which illustrates a third embodiment of the battery charger according to the present invention.
Figure 8:
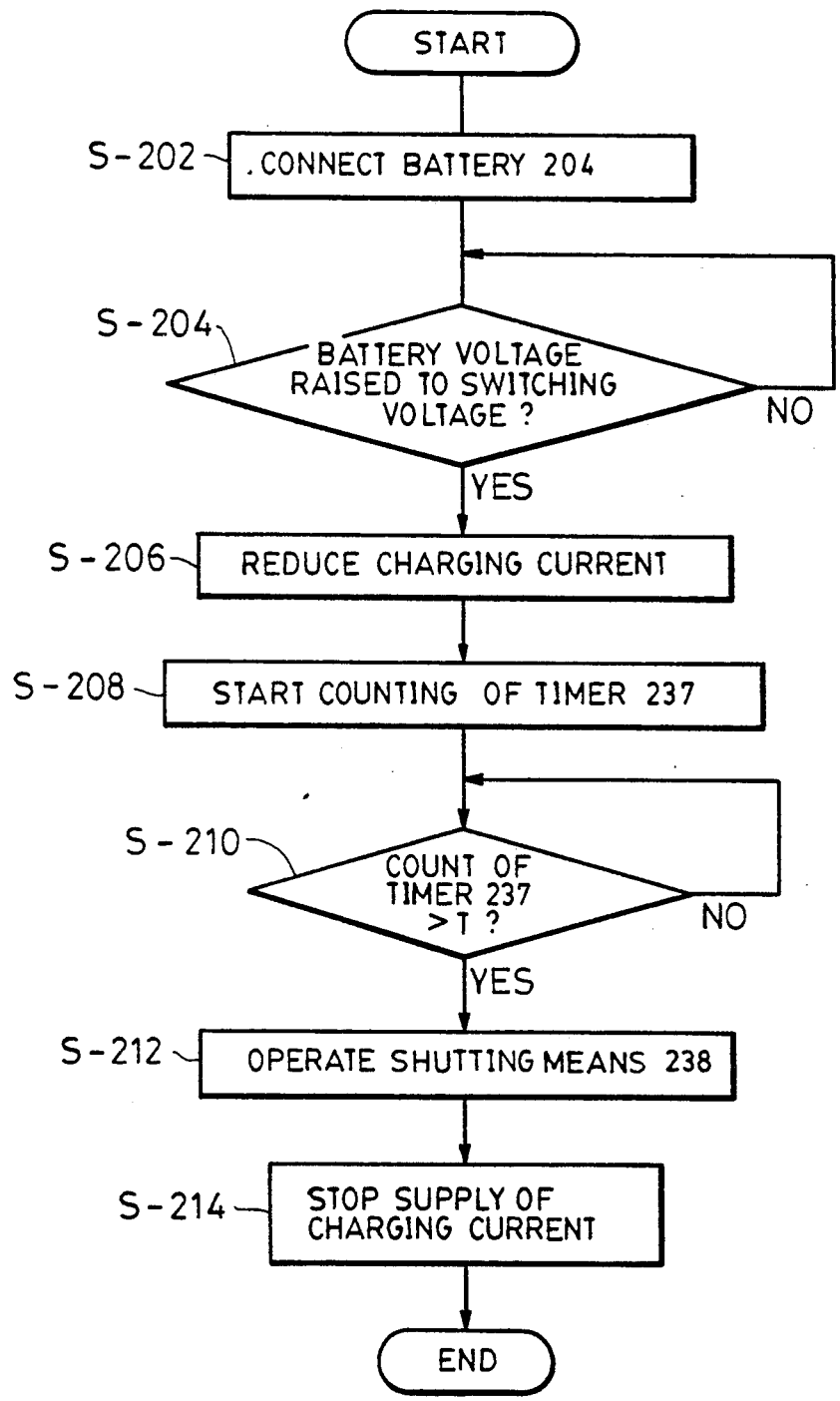
FIG. 8 is a flow chart which illustrates the operation of the battery charger shown in FIG. 7.

When the charging current detection means 133 detects the charging current, that is, when charging of the battery 104 is commenced, the first and second timers 134a and 134b start their time counting operations. The above-described timers 134a and 134b respectively have time T3 for the first timer 134a and time T4 for the second timer 134b. The above-described times T3 and T4 are properly determined in accordance with the standard specification of the subject battery to be charged. According to the second embodiment, time T2 for the first timer 134a is arranged to be about 5 minutes, while the time T4 for the second timer 134b is arranged to be about 1 hour and 15 minutes which is a value obtained by increasing one hour for charging by 25%. The above-described time T3 is arranged to be longer than a time at which the first peak P1 takes place when the nickel-cadmium battery is, as shown in FIG. 6, charged (that is, time T3 is arranged to be longer than a time at which the initial voltage drop takes place). Time T4 is arranged to be longer than a time at which full charge peak P2 takes place when the battery has been completely charged.

In step S106, it is determined whether or not the first timer 134a has counted set time T3. If it has been determined that the first timer 134a has counted set time T3, the flow advances to step S-108 in which the first timer 134a causes the operation of the maximum peak detection means 135 to be commenced. The maximum peak detection means 135 successively compares the detection signal of the battery voltage so as to determine whether not it is the maximum peak. In step S-110, voltage $E_V$ of the battery 104 is supplied to the maximum peak detection means 135 via the battery voltage detection means 131 and the filter means 132 for removing noise from the detected voltage signal so that the maximum peak (P2) of the battery voltage is detected. In consequence, the full charge is confirmed. Subsequently, a maximum peak detection signal is generated so as to be supplied to the shutting timer 136.

Then, the flow advances to step S-112, the shutting timer 136 commences its time counting operation in response to the maximum peak detection signal. That is, the maximum peak detection means 135 detects the maximum peak of the battery voltage, and the time counting operation is started at which the full charge is confirmed. In step S-114, a time lapse from the time at which the maximum peak was detected is counted so as to be subjected to a comparison with a predetermined set time $\Delta t$ (see FIG. 6). If it has been determined that the result of the time counting operation exceeds set time $\Delta t$, the flow advances to step S-116. According to this embodiment, set time $\Delta t$ is arranged to be about one minute. Usually, set time $\Delta t$ is arranged to be 30 seconds to 5 minutes, and it can be properly determined in accordance with the type or the like of the battery to be charged. If the above-described set time $\Delta t$ has elapsed, the control signal is transmitted to the shutting means 137. In step S-116, the shutting means 137 generates the shutting signal in response to the control signal supplied from the shutting timer 136, the shutting signal being then supplied to the supply circuit 102. In consequence, the transistor (omitted from illustration) of the supply circuit 102 is turned off so that the supply of the charging current is stopped (step S-117).

Similarly to the first embodiment and to a case of a rapid charging operation, a predetermined current of a small level may be supplied to the battery 104 as the trickle current after the supply of the charging current has been stopped.

In step S-104, when the second timer 134b commences the counting operation, the flow advances to step S-118 in which it is determined whether or not the result of the counting operation has reached the predetermined time T4. If it has been determined that the result of the counting operation performed by the second timer 134b has reached the predetermined time T4, the flow advances to step S-116 regardless of the result of the determination made in step S-110. In step S-116, the supply of the charging current is stopped similarly. That is, there is provided a function reliably protecting the battery, the charger and the like from the overcharge by forcibly shutting the charging current, the shutting of the charging current being performed depending upon a determination made that the protecting function by means of detecting the maximum peak value of the charging voltage has not operated normally if the charging current is not stopped at the set time T4.

In step S-106, it is determined whether or not the result of the counting operation performed by the first timer 134a has exceeded time T3. If the same exceeds T3, the flow advances to step S-108 in which the maximum peak value holding means 135 is started. The above-described operation is performed for the purpose of preventing an erroneous operation which will take place due to the peak phenomenon (P1) of the charging characteristics of the nickel-cadmium battery generated at the early stage of the charging operation as shown in FIG. 6. As an alternative to the structure in which the peak detection means 135 is started, another structure may be employed in which the generation of the shutting signal in the shutting means 137 is allowed at that time.

The above-described times T3 and T4 for the corresponding timers 134a and 134b must be determined to be values with which the erroneous operation due to the charging characteristics can be prevented and an operation to serve as a backup can be enabled to be performed.

A protection function may be added to the structure according to the second embodiment, the protection function being arranged to shut charging if the battery voltage is dropped from the maximum peak level by a predetermined voltage.

The battery charger according to the second embodiment is capable of automatically detects the completion of the charge in accordance with the charging characteristics of the subject battery so as to shut the supply of the charging current.

THIRD EMBODIMENT OF BATTERY CHARGER

The battery charger according to a third embodiment comprises an AC to DC conversion circuit 201 for rectifying and smoothing AC power, a supply circuit 202 for stabilizing the output current from the AC to DC conversion circuit 201 so as to supply a predetermined charging current to a battery 204 and a control circuit 203 for controlling the charging current to be supplied to the battery 204.

The control circuit 203 comprises a battery voltage detection means 231 for detecting the voltage of the battery 204, a filter means 232 for removing noise of a detection signal detected by the battery voltage detection means 231 and a switching voltage setting means 233 for setting switching voltage $E_C$ which is lower than a rated charging voltage (full charge voltage). The control circuit 203 further comprises a voltage comparison means 234 for subjecting the battery voltage detected by the battery voltage detection means 231 and switching voltage $E_C$ set by the switching voltage setting means 233 to a comparison so as to generate a switching signal if the above-described battery voltage reaches the switching voltage. The control circuit 203 further comprises a charging current switching means 236 for reducing the charging current by a predetermined quantity when the battery voltage reaches the above-described voltage to be subjected to the comparison. The control circuit 203 further comprises a timer 237 arranged to be commenced to operate when the charging current has been made to be the above-described low charging current, a shutting means 238 for shutting the charging current after the above-described timer 237 has counted predetermined time T5. The charging current switching means 236 is provided as described above for the purpose of controlling the supply circuit 202 so as to switch the charging current to the low charging current in response to the switching signal supplied from the voltage comparison means 234. The timer 237 is a shutting timer arranged to commence the operation when the charging current is switched to the low charging current so as to transmit the control signal after a lapse of the predetermined time T5.

The thus constituted battery charger according to the third embodiment is operated as follows:

When the battery 204 is, in step S-202, connected to the charger, the AC is converted into a DC of a predetermined voltage by the AC to DC conversion circuit 201 and stabilized by the supply circuit 102 is supplied to the battery 204. Shutting and conducting of the charging current are, similarly to a conventional charger, controlled by turning on/off a transistor (omitted from illustration) of the supply circuit 202.

Figure 9:
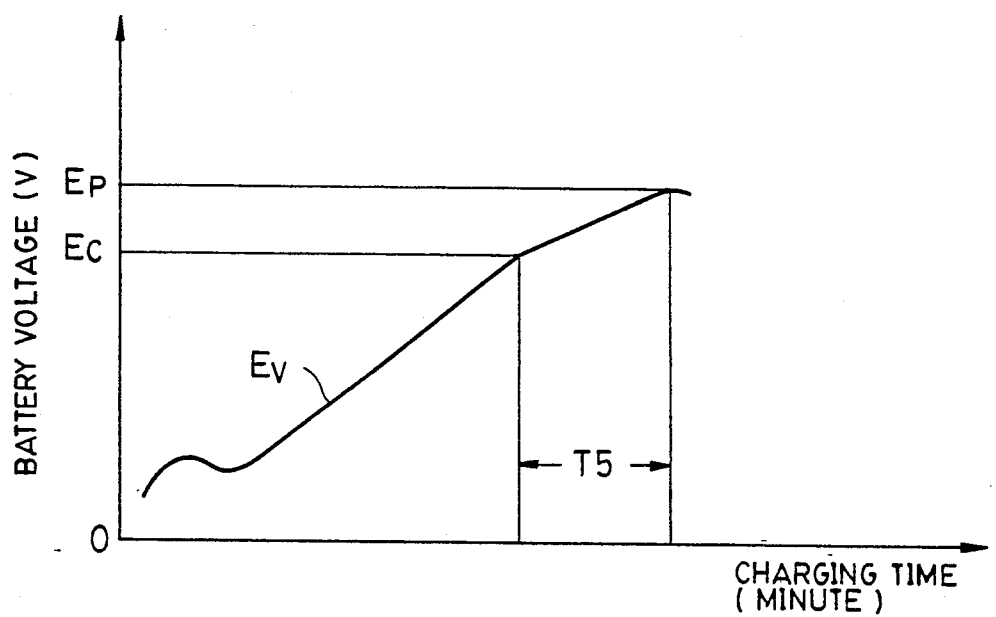
FIG. 9 illustrates a charging characteristic when a nickel-cadmium battery is charged by using the battery charger shown in FIG. 7.

Voltage $E_V$ (see FIG. 9) of the battery 204 is detected by the battery voltage detection means 231, the voltage $E_V$ being then supplied to the voltage comparison means 234 via the voltage detection means 231 and the filter means 232 so that it is subjected to a comparison with switching voltage $E_C$ set by the switching voltage setting means 233 (step S-204). The switching voltage $E_C$ is arranged to be a predetermined level which is lower than rated charging voltage $E_P$, $E_C$ being determined to be, for example, a level which is 70% to 90% of the rated charging voltage $E_P$.

Figure 10:
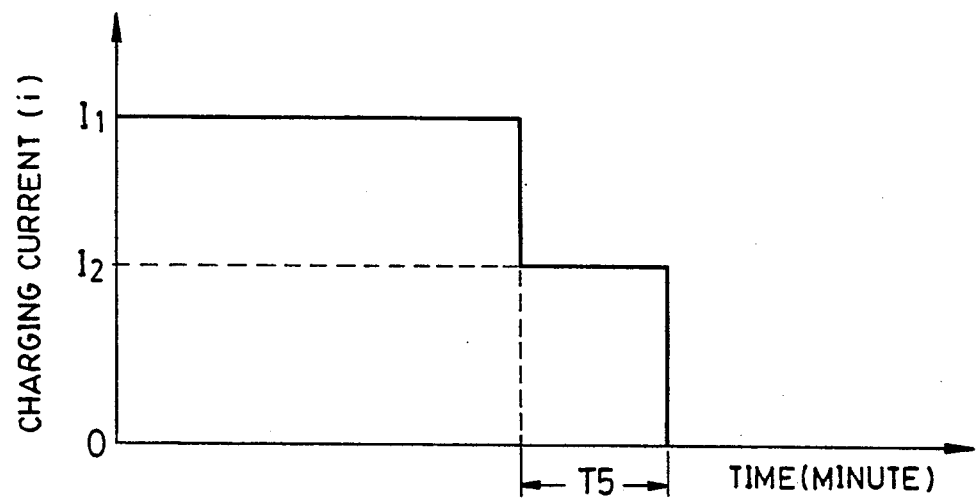
FIG. 10 illustrates the characteristics of a charging current in the battery charger shown in FIG. 7.
Figure 11:
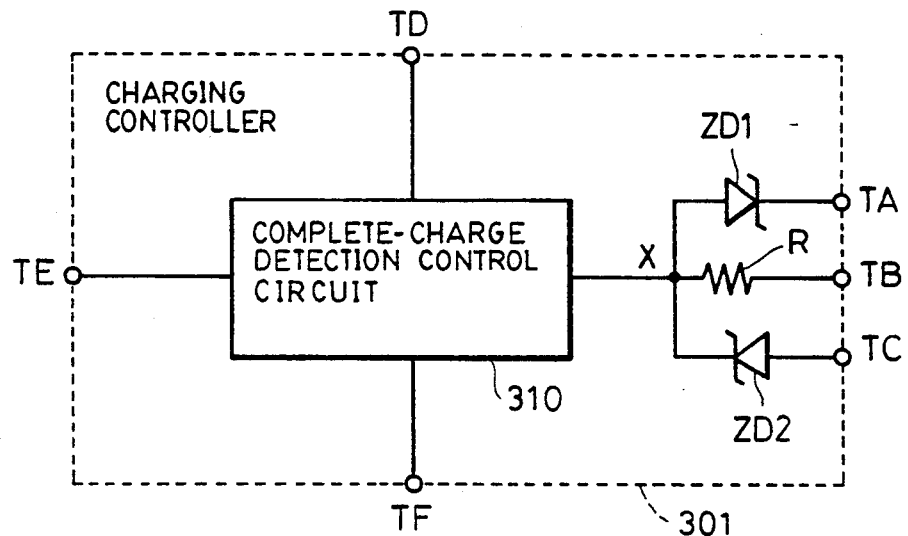
FIG. 11 is a circuit diagram which schematically illustrates a charge controller according to the present invention.

When battery voltage $E_V$ reaches the above-described switching voltage $E_C$, the flow advances from step S-204 to step S-206. In step S-206, the current switching means 236 generates a current reduction signal in response to the switching signal supplied from the voltage comparison means 234. The current reduction signal generated by the current switching means 236 is supplied to the supply circuit 202. In consequence, the charging current to be supplied from the supply circuit 202 is reduced by a predetermined quantity. That is, the charging current is, as shown in FIG. 10, reduced from relatively large current $I_1$ to relatively small current $I_2$ (the current can be switched by a conventional circuit). In next step S-208, the timer 237 commences its time counting operation. Subsequently, the flow advances from step S-210 to step S-212 in which the shutting means 238 generates the shutting signal after a predetermined time T5 has elapsed. The thus generated shutting signal is supplied to the supply circuit 202, the shutting signal causing the transistor (omitted form illustration) of the supply circuit 202 to be turned off. As a result, the supply of the charging current is stopped (step S-214). A predetermined current of a small level may be supplied to the battery 204 as the trickle current after the supply of the charging has been stopped.

Although $I_2$ is arranged to have a value which is the half of that of $I_1$, the charging current can be properly reduced to a suitable range from 70% to 30%. The above-described time T5 is properly determined in accordance with the standard specification of the subject battery 204 to be charged in such a manner that voltage $E_V$ exceeds rated charging voltage $E_P$.

The charger according to the third embodiment is arranged in such a manner that the charging current is switched from a normal value to a small value (small charging current) when battery voltage $E_V$ has become switching voltage $E_C$. In consequence, generation of a gas in the battery 204 which takes place when the voltage level approximates rated charging voltage $E_P$ (full charging voltage) can be prevented. Therefore, the above-described structure can effectively be applied to a rapid charge of the battery 204.

Although the charging current value is switched from a normal value to a small value according to the third embodiment, another arrangement may be employed in which the normal value is, in accordance with the status of charging of the battery 204, switched to a first small current value (a value which is smaller than the normal value by a predetermined quantity) and the first small current value is further switched to a second small current value (which is smaller than the first small current value). As an alternative to this, another structure may be employed in which the charging current is gradually reduced in accordance with the status of charging of the battery 204.

Furthermore, a protection circuit for stopping the supply of the charging current after the peak of the charging voltage has been detected may, if necessary, be additionally provided for the structure according to the third embodiment.

CHARGE CONTROLLER

The battery charger according to the first embodiment may employ, for example, a charge controller 301 arranged as follows:

The charge controller 301 comprises a full-charge detection control circuit 310 which includes a pair of DC power input terminals TD and TF, a battery voltage detection terminal X and a switching signal output terminal TE. The anode of a Zener diode ZD1 is connected to the battery voltage detection terminal X, while the cathode of the same is connected to the battery terminal voltage input terminal TA. Similarly, the cathode of the Zener diode ZD2 is connected to the battery voltage detection terminal X, while the anode of the same is connected to the battery terminal voltage input terminal TC. Furthermore, a non-polar load denoted by resistor R is placed to establish an electrical connection between the battery voltage detection terminal X and the battery terminal voltage input terminal TB. The battery terminal voltage is connected to a position between either the terminal TA or TC, which is determined in accordance with the arrangement of the circuit, and the terminal TB. The charge controller 301 is thus constituted.

Figure 12:
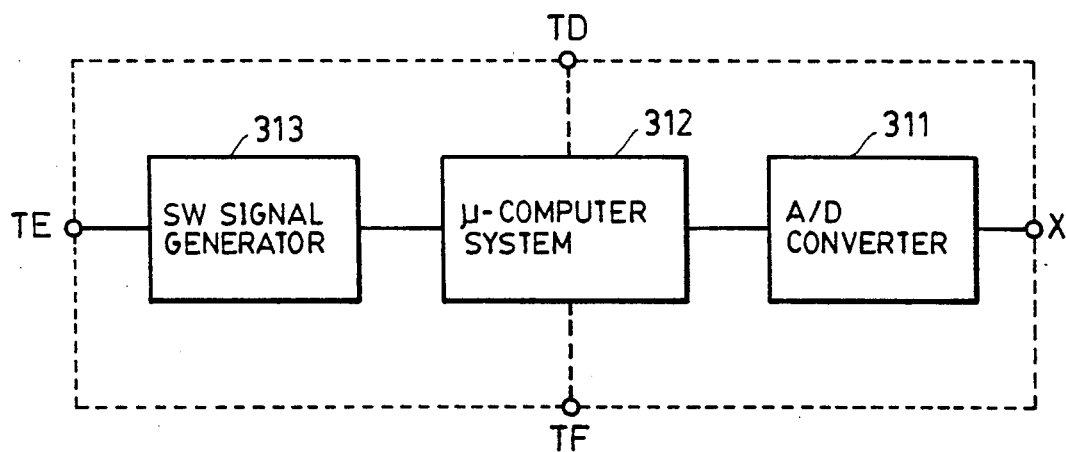
FIG. 12 is a circuit diagram which schematically illustrates a full charge detection control circuit of the charge controller shown in FIG. 11.

An example of the structure of the full-charge detection control circuit 310 is shown in FIG. 12. An A/D converter 311 is connected to the battery detection terminal X so as to convert the detected voltage into a digital signal. The output from the A/D converter 311 is supplied to a microcomputer system 312 so as to be calculated. If the microcomputer determines that the battery has been fully charged, the output denoting the full charge is supplied to a switching signal generator 313. In consequence, a control signal for causing a switching circuit connected to the charging circuit to be switched off is generated.

The microcomputer system 312 detects whether or not the battery voltage has passed its maximum value and dropped by $-\Delta V$. If it detects that the battery voltage has been dropped by $-\Delta V$, the microcomputer system 312 determines that the battery has been fully charged.

FIGS. 13-A, 13-B and 13-C illustrate a method of using the charge controller in a positive $-\Delta V$ detection mode.

FIG. 13-A is a circuit diagram which illustrates a state in which the charge controller and the other circuit are connected to one another. A DC power source circuit 322 has a terminal of maximum voltage Va, a terminal of intermediate voltage Vb and a ground terminal. A series connection between the battery 321 and the switching element 323 is placed to establish an electrical connection between the ground terminal and the Va terminal of the power source circuit 322. The switching element 323 and constituted by, for example, a bipolar transistor. Voltage $V_C$ at the junction between the switching element 323 and the battery 321 is connected to the battery terminal voltage input terminal TA of the charge controller. Furthermore, both the battery terminal voltage input terminal TB and the DC power input terminal TF are connected to a ground potential. The terminal TD which is the positive DC current input terminal of the charge controller is connected to the intermediate voltage Vb of the power source circuit, while the switching signal output terminal TE is connected to the switching element 323. In the thus established connection, the battery terminal voltage input terminal TC is not used.

The connection established in the charge controller is selectively performed in accordance with the type of the structure of the charge circuit. The relationship between the potentions of the battery terminal voltage input terminals TA and TB connected to the two terminals of the battery and the power supply voltage of a $-\Delta V$ detection circuit 315 is shown in FIG. 13-B.

The ground potential and the intermediate voltage Vb are supplied from the power source circuit 322 to the charge controller 301 before they are supplied to the $-\Delta V$ detection circuit 315. Since the voltage $V_C$ across the battery is, as shown in FIG. 13-C, able to change from 0 to Va, the $-\Delta V$ detection circuit 315 cannot make a judge if the above-described voltage exceeds Vb. Accordingly, the voltage $V_C$ between the battery terminals is supplied to the series circuit composed of the Zener diode ZD1 and the resistor R so that an output in the form of $V_X=V_C-V_Z$ is detected at the junction therebetween. In the above-described structure, the level of the Zener voltage $V_Z$ is constant regardless of the value of $V_C$. Therefore, when $V_C$ is lowered by $-\Delta V$, $V_X$ is also lowered by $-\Delta V$. In consequence, the value of the intermediate voltage $V_X$ can be made to be within a range between 0 and Vb when the intermediate voltage $V_X$ is lowered by $-\Delta V$.

FIGS. 14-A to 14-C illustrate a negative $-\Delta V$ detection mode. FIG. 14-A illustrates a state of a connection established in the negative $-\Delta V$ detection mode. The power source circuit 322 is arranged to be similar to the power source circuit shown in FIG. 13-A. The battery 321 is connected to the power source circuit 322 via the switching element 325 connected to the cathode of the battery 321. The voltage $V_C$ at the junction between the battery 321 and the switching element 325 is connected to the battery voltage input terminal TC. The battery terminal voltage input terminal TB is, together with the DC power input terminal TD, connected to the Va terminal of the power source circuit and the anode of the battery 321. The other DC power input terminal TF of the charge controller 301 is connected to the intermediate voltage terminal Vb of the power source circuit 322. The switching signal output terminal TE is connected to the switching element 325.

An essential portion of the above-described connection is shown in FIG. 14-B. That is, the $-\Delta V$ detection circuit 315 disposed in the charge controller 301 is given Va and Vb as the power source voltage. The battery terminal voltage is connected to the two terminative ends of the series circuit composed of the resistance load R and the Zener diode ZD2. Since the terminal TA adjacent to the resistance load R is connected to the reference potential Va, the battery terminal voltage $V_C$ is changed with respect to Va.

The terminal voltage $V_C$ is, as shown in FIG. 14-C, gradually lowered in accordance with the process of the charging operation until it is lowered to the minimum value when the battery has been fully charged. The terminal voltage $V_C$ is then raised. When the voltage rise $-\Delta V$ (although it is a voltage rise in actual, it is expressed by $-\Delta V$ similarly to the detection of the positive $-\Delta V$) is detected, the fact that the battery has been fully charged can be detected. Since the battery terminal voltage $V_C$ is undesirably reduced to a value which is smaller than Vb, it cannot, as it is, be detected by the $-\Delta V$ detection circuit 315. Therefore, the voltage between the terminals is supplied to the series circuit composed of the resistor R and the Zener diode ZD2 so that the value of $V_X=V_C+V_Z$ is supplied from the battery voltage detection terminal X to the $-DV$ detection circuit 315. Thus, the negative $-\Delta V$ can be detected.

Then, an operation of controlling the charging operation by using the charge controller which is connected as shown in FIG. 13 or FIG. 14 will be described in accordance with a flow chart for the basic operation shown in FIGS. 15 and 16.

Figure 15:
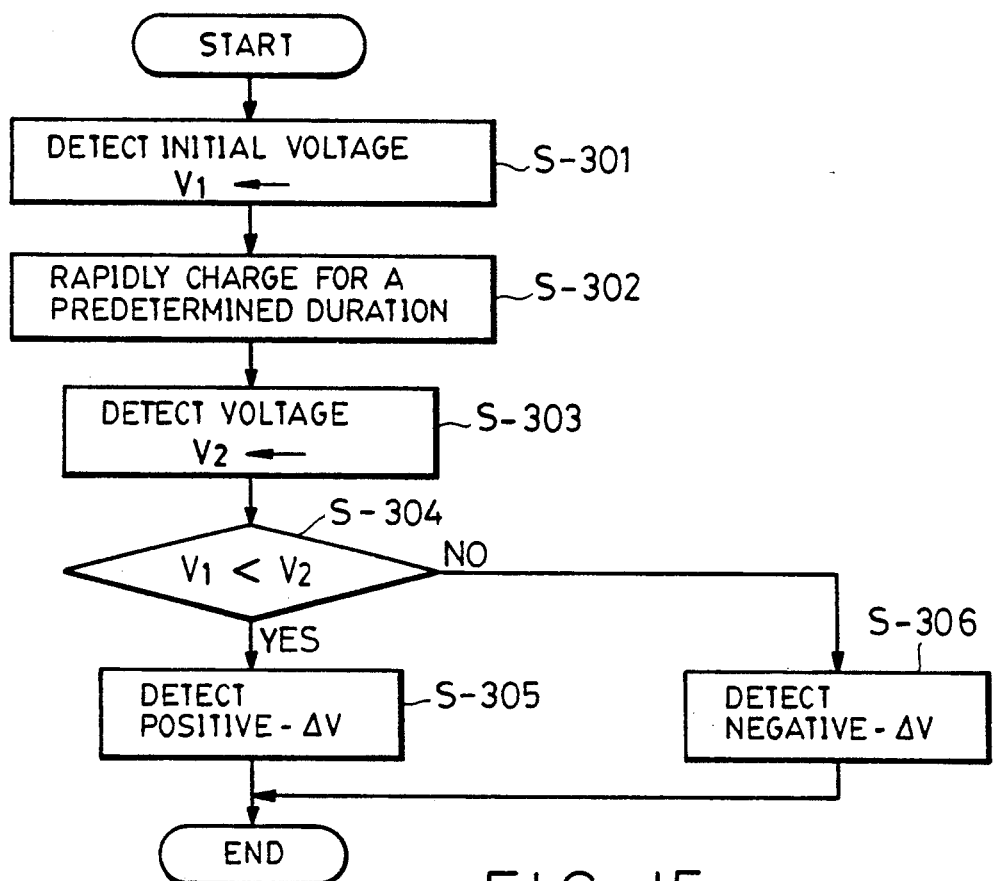
FIGS. 15 and 16 are respectively flow charts which illustrates the basic charging operation performed by the charge controller according to the embodiment of the present invention.
Figure 16:
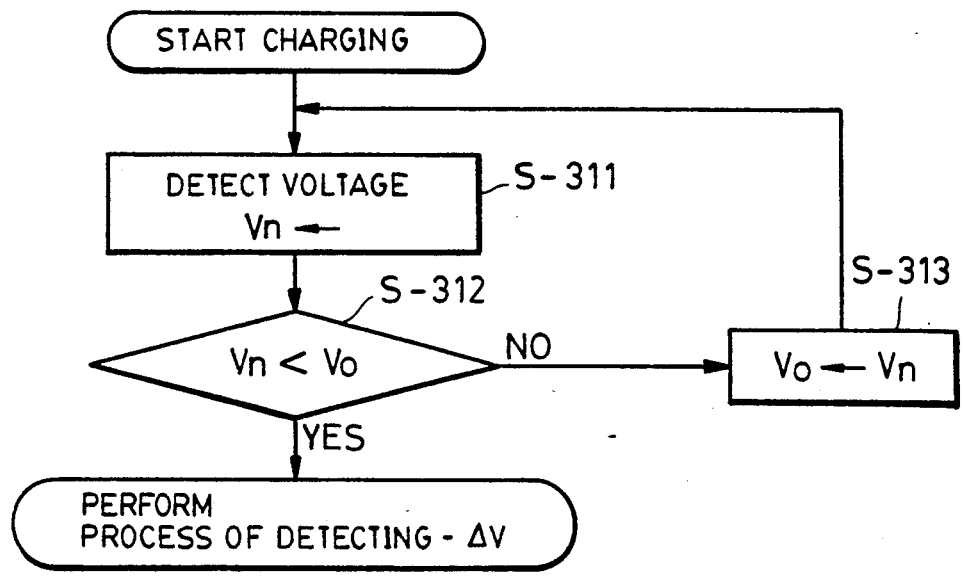

FIG. 15 is a schematic flow chart for the charging operation control. When the process is started, the initial voltage of the battery is detected, and the thus detected initial voltage is stored as V1 (step S-301).

Subsequently, the battery is rapidly charged for a predetermined time (step S-302). After the rapid charging has been completed, the voltage of the battery is detected. Then, the thus detected battery voltage is stored as V2 (step S-303) so as to be subjected to a comparison with the initial voltage V1 (step S-304).

The fact that the voltage V2 after the battery has been changed is higher than the initial voltage V1 means that the voltage is detected on the anode side of the battery. Therefore, the positive $-\Delta V$ detection is performed in accordance with an arrow designated by symbol Y (step S-305). The fact that the initial voltage V1 is higher than the voltage V2 after the battery has been charged, it means a fact that the voltage detection is performed on the cathode side of the battery. Therefore, the negative $-\Delta V$ detection is performed in accordance with an arrow designated by symbol N (step S-306). When $-\Delta V$ is detected, the operation is ended.

Then, an operation of detecting the positive $-\Delta V$ will be described with reference to FIG. 16. After the charging operation has been started, a clock signal which is generated at a predetermined timing is used to start the detecting operation so that the battery voltage is detected. The thus detected voltage is, as Vn, stored (step S-311).

The detected voltage Vn and the previous detected voltage $V_0$ are subjected to a comparison (step S-312). If the previous voltage $V_0$ is higher than the novel voltage $V_n$, it can be determined that a fact that battery voltage exceeds the maximum value and the voltage drop has begun is detected. Therefore, the $-\Delta V$ detection process is performed in accordance with the arrow Y. If the newly detected voltage $V_n$ is higher than the previous voltage $V_0$, it can be determined that the battery voltage is being raised. Therefore, the newly detected voltage $V_n$ is, as the previously detected voltage $V_0$, stored in accordance with the arrow N (step S-313), and the voltage detecting operation is repeated.

Although the $-\Delta V$ detecting operation is described, the procedure of the voltage change is similarly performed in the negative $-\Delta V$ detecting operation but the direction of the change in the voltage is reversed. Therefore, that operation may be performed in such a manner that the Y and N are exchanged in the block for comparing the new and previously detected voltages $V_n$ and $V_0$.

The above-described charge controller can be used in both a system in which the anode side of the battery is made to be the reference potential and a system in which the cathode side of the battery is made to be the reference potential by determining the connection method.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. A battery charger having a supply circuit for supplying a predetermined charging current to a battery and a control circuit for controlling charging of said charging current to said battery, said control circuit of said battery charger comprising:
   battery voltage detection means for detecting the voltage of said battery;
   peak value holding means for holding a peak value of said voltage of said battery detected by said battery voltage detection means;
   voltage comparison means for subjecting said peak voltage held by said peak value holding means and said voltage of said battery detected by said battery voltage detection means to a comparison; and
   means for shutting said charging current when said voltage comparison means determines that said detected voltage of said battery is smaller than said peak value of said voltage by a predetermined quantity,
   and a first timer which is set to a time which exceeds a time at which an initial voltage drop takes place, said first timer acting to prevent said operation of shutting said charging current performed by said shutting means in said set time, and said first timer actuating said peak value holding means after said set time has elapsed.

2. A battery charger according to claim 1, wherein said first timer allows said shutting means to generate said shutting signal after said set time has elapsed.

3. A battery charger according to claim 1, wherein said control circuit further includes a second timer which is set to a time which exceeds a time which is necessary to fully charge said battery, said second timer being arranged to actuate said shutting means after said set time has elapsed regardless of a signal supplied from said voltage comparison means so as to shut a supply of said charging current to said battery.

4. A battery charger according to claim 1, wherein said battery is a nickel-cadimium battery.

5. A battery charger having a supply circuit for supplying a predetermined charging current to a battery and a control circuit for controlling charging of said charging current to said battery, said control circuit of said battery charger comprising:
   battery voltage detection means for detecting the voltage of said battery;
   maximum peak detection means for detecting the maximum peak of the voltage of said battery detected by said battery voltage detection means so as to generate a maximum peak signal;
   a shutting timer arranged to start time counting in response to said maximum peak signal so as to transmit a charge stopping signal after a predetermined time has elapsed;
   means for shutting said charging current in response to said charge stopping signal;
   and an additional timer which is set to a time which exceeds a time at which an initial voltage drop takes place, said timer acting to prevent said operation of shutting said charging current performed by said shutting means;
   and said additional timer actuating said maximum peak detection means after said set time has elapsed.

6. A battery charger according to claim 5, wherein a time of 0.5 to 5 minutes is set to said shutting timer.

7. A battery charger according to claim 5, wherein said additional timer allows said shutting means to generate said shutting signal after said set time has elapsed.

8. A battery charger according to claim 5, wherein said control circuit further includes a second additional timer which is set to a time which exceeds a time which is necessary to fully charge said battery, said second additional timer being arranged to actuate said shutting means after said set time has elapsed regardless of a signal supplied from shutting means so as to shut a supply of said charging current to said battery.

9. A battery charger according to claim 5, wherein said battery is a nickel-cadimium battery.

* * * * *